United States Patent Office 2,824,854
Patented Feb. 25, 1958

2,824,854

BIS(SALICYLOYL) BENZENE DERIVATIVES AND COMPOSITIONS CONTAINING THE SAME

David A. Gordon, Midland, Mich., assignor to The Dow Chemical Company, Midland, Mich., a corporation of Delaware No Drawing. Application December 1, 1955
Serial No. 550,479

2 Claims. (Cl. 260—45.95)

This invention relates to new organic compounds and to polymeric compositions containing the same. More particularly, it relates to bis(chlorosalicyloyl) benzene and to polymeric compositions stabilized with the same.

Many polymers, such as haloethylene polymers, are subject to rapid and severe degradation and consequent discoloration upon exposure to sunlight. To overcome that disadvantage it has been found necessary to incorporate certain additives into compositions containing such polymers. Various compounds having a carbonyl group attached to a benzene ring in an ortho position to a hydroxyl group have been known to have utility as light stabilizers in such compositions. Several of these compounds, however, are odoriferous and volatile. Any odor in the stabilizer will be transferred to the stabilized composition thus greatly reducing the merchandisability of any article prepared from the composition. Also, a volatile ingredient in a polymeric composition will gradually volatilize out of the composition leaving the composition unprotected.

Such compounds vary in their effectiveness for absorbing ultra-violet light and vary in their compatibility with the polymer employed in the composition. Thus, it is impossible to predict the effectiveness of any particular compound as a light stabilizer for any given polymer.

It is accordingly the principal object of this invention to provide a new group of organic compounds having the stated utility.

It is a further object to provide a polymeric composition stabilized against the degradative effects of light by means of such compounds.

The above and related objects are accomplished by means of certain non-vicinal bis(chlorosalicyloyl) benzene derivatives having the general formula:

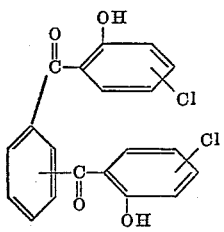

wherein the chlorosalicyloyl groups are in one of the positions meta and para to each other and wherein the chlorine groups are nuclearly substituted. The invention additionally comprises light-stable thermoplastic compositions prepared by intermixing such compounds with haloethylene polymers.

The method of preparation of the compounds will be illustrated by the following preparation of meta-bis(5-chlorosalicyloyl) benzene. One mole of di-4-chlorophenyl isophthalate and a large excess of $AlCl_3$ were ground and mixed and added to 1,1,2,2-tetrachloroethane. The reaction mixture was heated at 150° C. for 6 hours, then cooled, and dilute HCl added. The solvent was removed by steam distillation after which the residue was filtered. The product was then washed several times with dilute HCl following which it was stirred into cold 10 percent caustic, filtered and the ketone reprecipitated with HCl. The ketone was extracted overnight with ethanol and dried. The product did not melt at temperatures up to 300° C. and was insoluble in most organic solvents, such as ethanol, dioxane, chlorobenzene, and methyl ethyl ketone.

The compounds were evaluated as light stabilizers for haloethylene polymers. Because of their low odor level they produced compositions which were more merchandisable than compositions prepared from previous stabilizers. In addition, their low volatility caused a more permanent stabilization than prior compounds.

As light stabilizers the compounds may be employed in an amount of from 0.5 to 6 percent by weight based on the weight of the polymer employed. It is possible to use the compounds in conjunction with other known stabilizers.

The compounds of this invention have been found to be particularly effective in stabilizing those copolymers of vinylidene chloride and another copolymerizable monomer, such as vinyl chloride, in which the vinylidene chloride is present in an amount of at least 50 percent by weight.

The effectiveness of the stabilizing compounds of this invention will be more apparent from the following illustrative example in which all parts and percentages are by weight.

Example

A series of samples was prepared from a basic formulation consisting of 95 parts of a copolymer prepared from 85 percent vinylidene chloride and 15 percent vinyl chloride and 5 parts of acetyl triethyl citrate as a plasticizer. To some of the samples of the basic formulation was added an amount of a stabilizer of this invention. Another series of samples used 2-hydroxy-5-chlorobenzophenone, a known stabilizer, for comparative purposes, one of the samples was left blank. The amounts of stabilizer used in each sample is shown in the table. The samples were molded into sheets 0.01 inch thick and exposed for 3 months to direct sunlight in the State of Florida. After exposure the sheets were examined visually for darkening. The results are listed in the following table.

Table

| Stabilizer | Percent by weight | Color after 3 months' exposure |
|---|---|---|
| None | | dark brown. |
| 2-hydroxy-5-chlorobenzophenone | 0.5 | brown. |
| Do | 1.0 | Do. |
| Do | 2.0 | light tan. |
| m-bis(5-chlorosalicyloyl) benzene | 3.0 | darkened very slightly. |
| Do | 6.0 | Do. |

It can be seen that the derivatives of this invention provide appreciably greater protection to the polymer composition against the degradative effects of sunlight than does a known light stabilizer.

I claim:
1. As a new organic compound, meta-bis(5-chlorosalicyloyl) benzene having the formula:

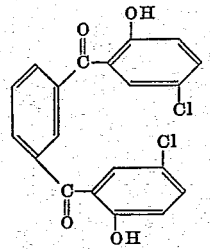

characterized by being a solid melting at a temperature above 300° C. and being insoluble in ethanol, dioxane, chlorobenzene, and methyl ethyl ketone.

2. A thermoplastic composition comprising a haloethylene polymer and from 0.5 to 6.0 percent by weight of meta-bis (5-chlorosalicyloyl) benzene.

References Cited in the file of this patent
UNITED STATES PATENTS 2,659,709 Daglish et al. _____ Nov. 17, 1953

FOREIGN PATENTS 680,409 Great Britain _____ Oct. 1, 1952

OTHER REFERENCES

Blicke et al.: "Journal of the A. C. S.," vol. 60, July-December 1938, pages 2283–2285.